United States Patent
Baier et al.

(10) Patent No.: US 9,132,963 B2
(45) Date of Patent: Sep. 15, 2015

(54) MULTIPART CHAIN FIXING DEVICE, TROUGH ELEMENT AND PARTS FOR THE SAME

(75) Inventors: Eugen Baier, Schwelm (DE); Siegfried Schmidt, Bottrop (DE); Uwe Tillessen, Kamen (DE); Frank Fischer, Lünen (DE); Jörg Wirtz, Witten (DE); Bernhard Wleklinski, Werne (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 214 days.

(21) Appl. No.: 13/702,118

(22) PCT Filed: Jun. 9, 2011

(86) PCT No.: PCT/IB2011/052516
§ 371 (c)(1),
(2), (4) Date: Feb. 5, 2013

(87) PCT Pub. No.: WO2011/158157
PCT Pub. Date: Dec. 22, 2011

(65) Prior Publication Data
US 2013/0199898 A1    Aug. 8, 2013

(30) Foreign Application Priority Data
Jun. 16, 2010    (DE) .................. 20 2010 005 647 U (51) Int. Cl.
*B65G 19/18*    (2006.01)
*B65G 19/28*    (2006.01)

(52) U.S. Cl.
CPC .............. *B65G 19/287* (2013.01); *B65G 19/18* (2013.01)

(58) Field of Classification Search
CPC ........ B65G 19/10; B65G 19/18; B65G 19/24; B65G 19/282; B65G 19/285
USPC .................... 198/735.2, 813, 861.1
See application file for complete search history.

(56) References Cited

U.S. PATENT DOCUMENTS 4,705,160 A * 11/1987 Grundken et al. ......... 198/735.4
8,794,492 B2 * 8/2014 Ballou et al. ............. 224/42.34

FOREIGN PATENT DOCUMENTS

| DE | 31 35 989 | 7/1983 |
| DE | 32 23 939 | 12/1983 |
| DE | 34 37 603 | 4/1986 |

(Continued)

OTHER PUBLICATIONS

International Search Report and Written Opinion for International Application No. PCT/IB2011/052516, dated Sep. 26, 2011, 10 pages.

*Primary Examiner* — Gene Crawford
*Assistant Examiner* — Lester Rushin (57) ABSTRACT

The invention relates to a multipart chain fixing device for securing at least one conveyor chain on a trough element of especially an underground scraper chain conveyor. The fixing device comprises a bridge part (60), which has a bridge bar (62) that at least partially overlaps the conveyor chain in a positive-locking manner and ends in two lateral side end portions (61). It also comprises two side parts (70), which are fastenable to the trough element pan and to which the side end portions 61 are releasably securable by positive-locking means. For providing a chain fixing device, inclusive of the associated trough element and the individual components, which offer increased safety in underground usage, combined with simple assembly, the side parts (70) are releasably fastenable in a positive-locking manner in cavities in the conveyor floor of the trough element.

26 Claims, 6 Drawing Sheets

(56) References Cited

FOREIGN PATENT DOCUMENTS

| | | | |
|---|---|---|---|
| DE | 3437603 A1 * | 4/1986 | |
| DE | 35 02 413 | 7/1986 | |
| DE | 298 06 629 | 7/1998 | |
| DE | 203 00 240 | 3/2003 | |
| DE | 20315759 U1 * | 1/2004 | |
| GB | 721481 A * | 1/1955 | |
| SU | 1277886 | 12/1986 | |

* cited by examiner

MULTIPART CHAIN FIXING DEVICE, TROUGH ELEMENT AND PARTS FOR THE SAME

CROSS-REFERENCE TO RELATED APPLICATIONS

This Application claims the benefit of priority to international patent application number PCT/IB2011/052516, having a filing date of Jun. 9, 2011, titled "Multipart Chain Fixing Device, Trough Element and Parts for the Same" which claims the benefit of priority to German patent application number DE 202010005647.0, filed on Jun. 16, 2010, including the specification, drawings, claims and abstract, which are incorporated herein by reference in their entirety.

BACKGROUND

The invention relates to a multipart chain fixing device for temporarily blocking at least one conveyor chain on a trough element of a chain conveyor, in particular of an underground scraper chain conveyor, comprising a bridge part, which has a bridge bar that at least partially overlaps the conveyor chain in a positive-locking manner and ends in two lateral side end portions, and comprising two side parts, which can be fastened to the trough pan and to which the side end portions of the bridge part can be releasably secured by positive-locking means. The invention further relates to a trough element for a chain conveyor, in particular an underground scraper chain conveyor, comprising an upper strand, comprising a lower strand, comprising side profiles for guiding driver elements of a conveyor chain, comprising a conveyor floor separating the upper strand and the lower strand, preferably comprising an intermediate floor beneath the conveyor floor, and comprising a device for applying a chain fixing device. Finally, the invention also relates to the associated bridge part or the associated side parts for the chain fixing device.

DE 298 06 629 U1 discloses a chain fixing device in which, on the bridge part and on the side parts, recesses such as, for example, a central pass-through opening in the bridge portion of the bridge part, cutouts on the bottom side of the bridge part, a purely one-sided, positive-locking stop wall for the chain links in the direction of pull, and recesses on the rear and bottom sides of the side parts are provided in order to enhance the ease of handling of the chain fixing device by lightening of the weight. In order to reduce the weight of the bridge, it is further provided that the side end portions are configured as tongues, which engage in side slits within the side parts. For the fixing of the bridge, those end faces of the tongues which point in the direction of pull butt against a front wall which bounds the side slit in the direction of pull. The side parts can be bolted to the trough side profiles by means of lock pins and the tongue-like side end portions of the bridge can be secured within the side slits by means of further lock pins.

Where this chain fixing device is used in underground scraper chain conveyors, particularly when the trough side profiles of the conveyor trough are already exhibiting low to medium wear, an unfavourable widening of those plug-in openings by which the side parts are fixed relative to the trough side profiles can occur. This leads to excessive wear and to non-usability of the respective trough pan, although the trough side profiles of the trough pan would still be functional. In addition, the rear-side openings of the chain link receptacles, which openings are provided in the chain fixing device according to DE 298 06 629 U1, pose a threat to the staff underground, since, in the event of a chain breakage of the horizontal chain link received in a positive-locking manner by the bridge part, a spring-back of the chain can arise.

SUMMARY

DE 203 00 240 U1 discloses a chain fixing device in which the bridge part and the side parts interlock via wedge-like form faces in order to convert a longitudinal movement of the bridge part into a transverse movement of the side parts and hereby clamp the chain fixing device in place between the side profiles and relieve the load upon the lock pin connections between the side parts and the bridge part.

The object of the invention is to provide a chain fixing device, inclusive of the associated trough element and the individual components such as bridge part and side parts, which, even in the case of high-capacity conveyors having, for example, rectangular chain links and/or having chain drives with high, installed drive outputs, offers increased safety in underground usage, combined with simple assembly.

This object is achieved for the chain fixing device by virtue of the invention defined in claim 1 and for the trough element by virtue of the invention defined in claim 13. Advantageous embodiments of the individual components of the chain fixing device are defined in the sub-claims.

In the chain fixing device according to the invention, the side parts can be releasably fastened in a positive-locking manner in cavities in the conveyor floor of the trough element. Through anchorage of the side parts in the conveyor floor and thus in a structural part of the trough element which is relatively strong and, at the same time, is anyway present and has a simple geometry, not only can particularly high forces be absorbed by the chain fixing device, but also the positive-locking connection between the side parts of the chain fixing device and the trough element can be realized over a large area and by means of strong parts, whereby the safety, but also the ease of assembly, is enhanced.

According to a particularly advantageous embodiment, each side part can have on its rear side a recess for a side end portion of the bridge part and beneath the recess a foot portion insertable into the cavities in the conveyor floor. As a result of this measure, firstly an easy to perform plug-in connection between the side part and the conveyor floor and secondly an easy to achieve and easy to undo plug-in connection between the bridge part on the one hand and side parts on the other hand can be created, without restrictions with respect to the size of the parts which cooperate with one another in a positive-locking manner. It is particularly advantageous if the foot portion has a tapered keel with laterally protruding bars for supporting at least the conveyor floor. In the assembled state, the tapered keel can then intrude into the cavity in the conveyor floor and, with the laterally protruding bars, particularly when the cavity in the conveyor floor is longer than the keel and the foot portion, can be displaced in the direction of pull and brought into a position in which the laterally protruding bars support the conveyor floor, where necessary also, where present, an intermediate floor, in order that the side parts are temporarily anchored to the conveyor floor in the vertical direction. The taper of the keel has at the same time the effect that the side parts can rest on the conveyor floor with the wider foot portion located above the keel. It is further advantageous when the keel is provided on the rear side with a laterally protruding sliding stop, in order that the foot portion, in the end assembly position located in the front portion of the cavity in the direction of pull, gains a defined position. Self-evidently, both the lateral bars and the sliding stop are respectively configured on both sides of the keel.

In a particularly advantageous embodiment, the side parts are provided on a front side with cantilever arms, the cantilever arms having a downward jutting supporting leg for support on the conveyor floor. By means of the cantilever arms, a torque support can be realized, whereby, through the choice of a suitable length of cantilever arms and due to a large lever arm, a comparatively small point load upon the conveyor floor itself is then obtained if a tensile force is applied to the conveyor chain due to faulty operation of the drives. The cantilever arms can be designed such that a scraper on the conveyor chain can also be spanned with the cantilever arms.

Further preferably, the bridge parts can be provided on the bridge bar between the side portions with downwardly projecting bosses for engagement in inner openings of horizontal chain links of the conveyor chain. This measure is particularly advantageous if, on the conveyor chain, horizontal chain links having straight front faces are used, as are described, for example, in WO2007/110 088 A1 of the Applicant, to whose disclosure content reference is additionally made. It is particularly advantageous if the bosses are of wedge-shaped configuration and have a rear-facing contact surface running in a path which is angled off less than perpendicularly, in order that the bosses can engage in the inner openings of the horizontal chain links and, at the same time, as a result of the angling-off of the bosses, a lifting force is prevented from being applied to the bridge part in the event of an unintended pull on the chain. Expediently, the bosses have an arc-shaped front face. The rear-facing contact surface of the bosses can at the same time be provided with contact surfaces for the noses of vertical chain links, which can then, where necessary, come to bear against the bosses over a large area. In order to achieve the aforementioned aims, it is particularly advantageous if the bridge parts, on the rear side of the bridge bar in the region of the bosses, have a constriction. The bridge parts can then be made relatively flat overall and at the same time leave sufficient clearance for the overlapping of the chain strands and for the positioning of the vertical chain links.

For differently designed conveyor chains, such as, for example, conveyor chains having round chain links as the horizontal and vertical chain links, the bridge parts, on the rear side of the bridge bar, can be provided with contact zones for the nose parts of these horizontal chain links of the conveyor chain. Further preferably, the bridge parts can then be provided between the contact zones with receiving slits for the vertical chain links, so that, on the bridge bar of the bridge part, no force-transmitting contact surfaces for the vertical chain links are present and the tensile force transmission is realized solely via the noses of the horizontal chain links.

In a chain fixing device according to the invention, it is also advantageous if for each side part there is provided a securing element, which can be partially inserted into the cavities in the conveyor floor and which in the assembled state, by positive locking, prevents displacement of the side part from an operating position, which is generally located at the front end of the cavity in the direction of pull, into a disassembly position, which is advantageously located at the rear end of the cavity. According to a particularly advantageous embodiment, the securing element can have a securing block and a securing pin displaceable in the securing block, which securing pin in a lock position projects beyond a front face of the securing block and in this lock position can be secured against displacement. The positive-locking interplay of the securing pin with, for example, a depression in the associated side part can have the effect that the securing element can be disassembled only when the securing pin is not in the lock position, whilst in the lock position the securing elements prevent displacement of the side parts within the cavities in the conveyor floor and thus securely protect against unintended release. According to an advantageous embodiment, a locking of the locking pin on the securing block against displacement can be achieved by the securing pin being connected to a preferably triangular locking clamp and being at the same time rotatable. The locking clamp then serves not only as a handle for the axial displacement of the locking pin, but also as a handle for turning the locking pin and the locking clamp into a specific pivot position in which the locking pin is blocked, preferably by means of the locking clamp, against renewed axial displacement into the release position. To this end, a groove can expediently be provided in the locking block, into which groove the locking clamp, in one of the pivot positions, intrudes in such a way that the locking clamp lies with a clamp leg parallel to the groove and hereby prevents an axial displacement of the locking pin. The locking clamp at the same time forms a holding element or handle in order to be able to favourably grasp the locking pin and displace it between the lock position and the release position.

The aforementioned object is achieved by a trough element in which, according to the invention, the device comprises at least two, or preferably exactly two cavities in the conveyor floor, into which cavities side parts of a multipart chain fixing device can be inserted in a positive-locking manner. In the trough element according to the invention, it is in turn advantageous that the side parts do not cooperate with the side profiles, and nor are there any bolts or the like present which must absorb forces in the direction of pull. Rather, the blocking force is applied via cavities in the conveyor floor, which cavities are formed, where necessary, also over a large area, and is transmitted into the trough element. In the trough element, according to a particularly advantageous embodiment, the cavities can be configured within a floor plate, which forms a constituent part of a multipart conveyor floor and is arranged in the trough element so as to be displaceable, at least by a short distance, transversely to the running direction of the conveyor chain. The transverse displacement of the floor plate can have the effect that though, in a sliding position of the floor plate, the cavities in the conveyor floor are open, they are closed off relative to the underlying lower strand or return strand by an intermediate floor or the like, in order to prevent any material components to be conveyed, inclusive of fine dust, from possibly falling down into the lower strand while the conveyor is currently in operation. Only in a different sliding position are the cavities then open downwards in such a way that the side parts of the chain fixing device can be inserted into the cavities.

According to one embodiment, the floor plate can be displaceable perpendicularly to the running direction. According to an alternative embodiment, the floor plate can be displaceable obliquely to the running direction, the effect of which is that the scraper connected to the conveyor chain, in running mining operation, can pass over the butt edges between the floor plate and the adjoining conveyor floor in a better, quieter and less wearing manner. The same advantage can also be obtained by the floor plate, towards one end, preferably towards the end situated on the working face side, being tapered at least slightly in width and accordingly having two rectilinear, though converging marginal edges. The release of the floor plate is also hereby facilitated. According to a particularly advantageous embodiment, the floor plate can be displaceable at an angle between 83° and 88° obliquely to the direction of pull or can be provided with marginal edges running correspondingly at these angles obliquely to the direction of pull. The floor plate can also be configured in the shape of a parallelogram and the conveyor floor has a corresponding parallelogram-shaped cutout.

As is known per se for chain conveyors and scraper chain conveyors, the trough element can, in particular, be provided with an intermediate floor beneath the conveyor floor. The intermediate floor can then be provided with further cavities, which are configured similarly or identically to those in the conveyor floor. The floor plate should be displaceable at least into a position in which the cavities in the conveyor floor and in the intermediate floor are in mutual alignment, whilst in another displacement position the floor plate covers the cavities in the conveyor floor in the downward direction, at the same time as the conveyor floor covers the cavities in the intermediate floor in the upward direction. When all the cavities are covered, then no material can fall down from the upper stand, which generally forms the feed strand, into the lower strand, which generally forms the return strand for the scraper chain and the scrapers.

According to an alternative embodiment, beneath the conveyor floor there can be disposed at least one plate portion, which is arranged in the trough element so as to be displaceable at least by a short distance transversely to the running direction of the conveyor chain and is provided with further cavities, which latter are configured similarly or identically to those in the conveyor floor, the plate portion being displaceable into a position in which the cavities in the conveyor floor and in the plate portion are in mutual alignment. In this embodiment, a one-piece conveyor floor can hence be used and the cavities in the conveyor floor are opened downwards, for the insertion of the side parts, by displacement of the intermediate floor located beneath the conveyor floor or of a plate portion located there, this in order to free the cavities in the conveyor floor in the downward direction.

According to an advantageous embodiment, the floor plate or the plate portion can project with a marginal portion laterally beyond the associated side profile of the trough element, the marginal portion being provided with at least one locking opening, into which a locking element, for example a simple pin, for detaining the floor plate or the plate portion in the normal usage position in which the cavities in the floor plate or in the plate portion are not in mutual alignment, can be inserted to prevent the floor plate or plate portion from possibly being unintentionally displaced from this usage position during operating use. The locking element can comprise, for example, a simple lock pin, which engages in a fastening eyelet which is welded onto one of the side profiles of the trough element in such a way that an associated retaining hole in the floor plate or plate portion, depending on the sliding position thereof, is located beneath the fastening eyelet. The cavities in the conveyor floor, in the floor plate and/or in the plate portion can in particular have on both sides multi-stepped side margins, in order that the side bars on the tapered keel of the foot portions of the side parts, depending on the positioning of the side parts, can laterally support at least the conveyor floor, whilst in another sliding position the cavity is of such a width that the foot portion, together with the side parts, can be lifted out of the cavities or inserted into the same, so that the assembly or disassembly of the side parts becomes possible.

Further advantages and embodiments of the chain fixing device, of the trough element, of the side part, of the bridge element and of the securing elements, which are configured particularly advantageously for use with a chain fixing device according to the invention, emerge from the following description of illustrative embodiments shown schematically in the drawing, wherein:

DETAILED DESCRIPTION

In FIGS. 1 to 4, a trough element (respectively represented only in part) according to a first illustrative embodiment of a high-capacity scraper chain conveyor having a double-middle chain as the conveyor chain 1 is shown in its entirety with the reference symbol 10, which chain is made up of horizontal chain links 2, having relatively flat and straight noses, and vertical chain links 3 which connect the same. At specific intervals, scraper elements 5 are connected to the inner openings 4 of the horizontal chain links 2, with which scraper elements material such as coal, which has been mined with a mining machine, here a shearer loader, can be transported away. In a manner which is known per se, each trough element 10 is provided with an upper strand 6 as the feed strand and an underlying lower strand 7 as the return strand for the conveyor chain 1. To both sides of the trough element, a side cheek 8 consisting of a profiled rolled section is respectively arranged to rise vertically upwards, which side cheeks are connected to each other by a welded-on lower strand floor 9, a conveyor floor 20, which separates the upper strand 6 and lower strand 7 one from another, and an intermediate floor 21, which is located directly beneath the conveyor floor 20 and is supported on a cranked part 8a of the side cheeks 8 and is welded on there. In the upper strand 6, the scraper elements 5 are guided with their ends on lateral side profiles 11, which are fastened, where necessary exchangeably, to the side cheeks 8, whilst in the lower strand the side cheeks 8 at the same time form the side boundaries for the lower strand 7. In the shown illustrative embodiment, the trough elements 10 are provided with attachment parts for a shearer loader and have for this purpose connecting brackets 12, to which rack and pinion rods for a loader shearer can be fastened.

Figure 1:
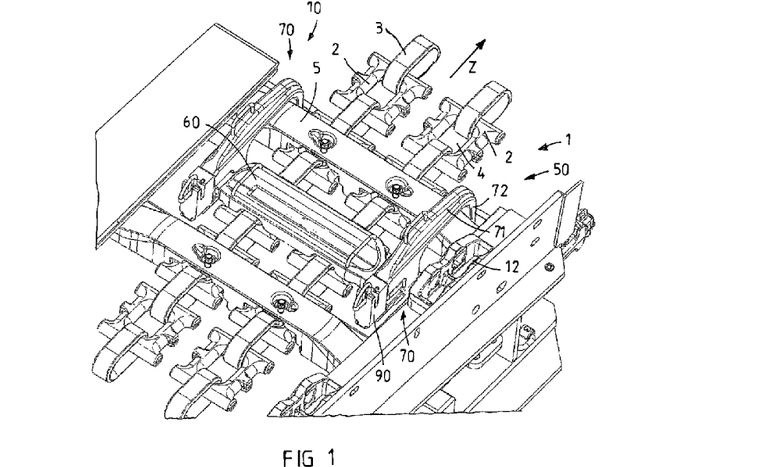
FIG. 1 shows a sub-portion of a trough element with double-middle high-capacity chain and fitted chain fixing device in perspective view according to a first illustrative embodiment.
Figure 2:
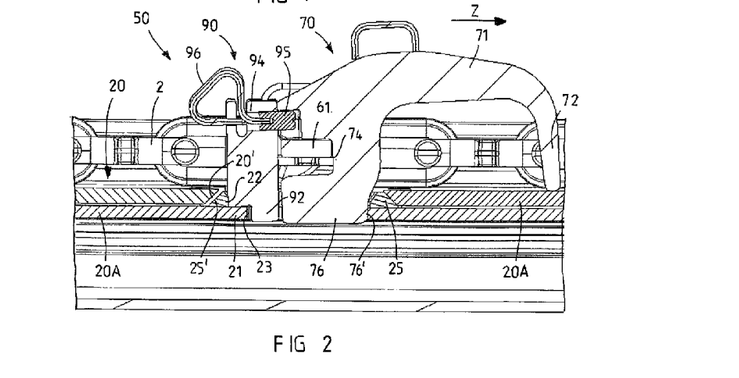
FIG. 2 shows the trough element with fitted chain fixing device according to FIG. 1 in horizontal section through a side part.
Figure 3:
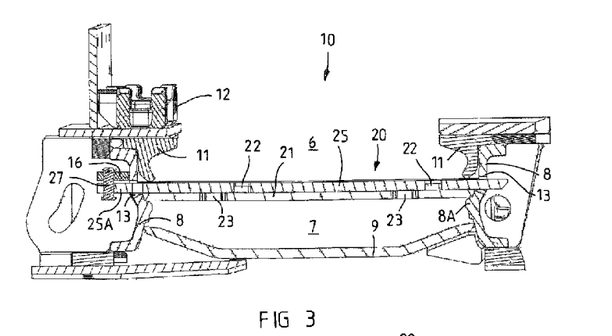
FIG. 3 shows a longitudinal section through a trough element according to the invention according to a first illustrative embodiment without chain fixing device and conveyor chain.
Figure 4:
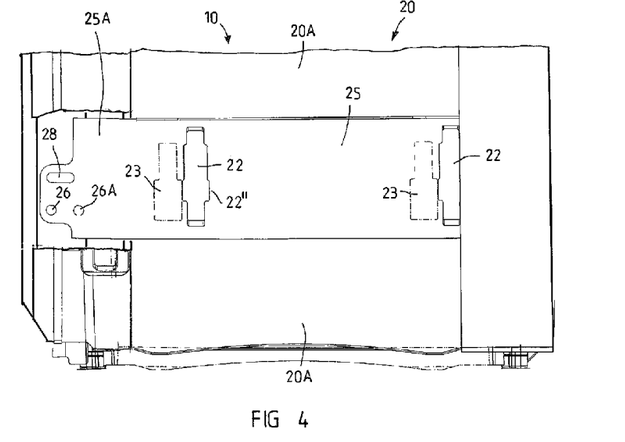
FIG. 4 shows schematically in heavily simplified representation a top view, partially broken open, of the trough element from FIG. 3.
Figure 5:
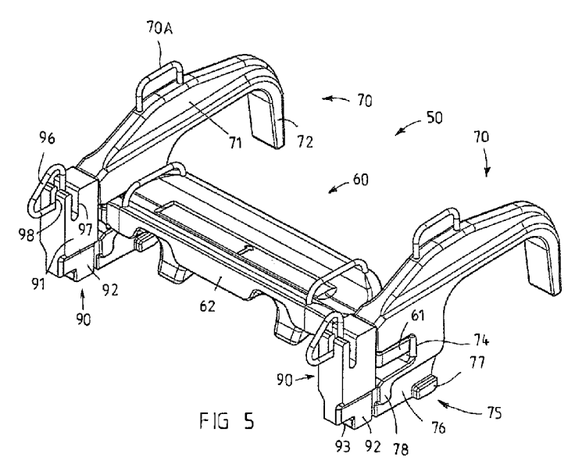
FIG. 5 shows the chain fixing device in perspective view in detail.
Figure 6:
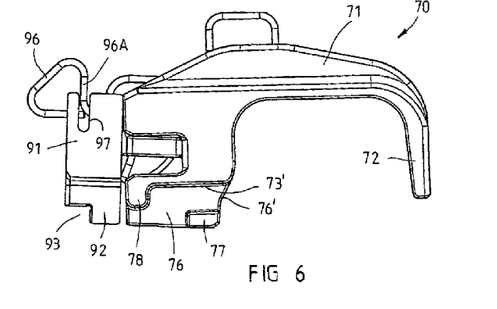
FIG. 6 shows the chain fixing device from FIG. 5 in side view.
Figures 7, 8:
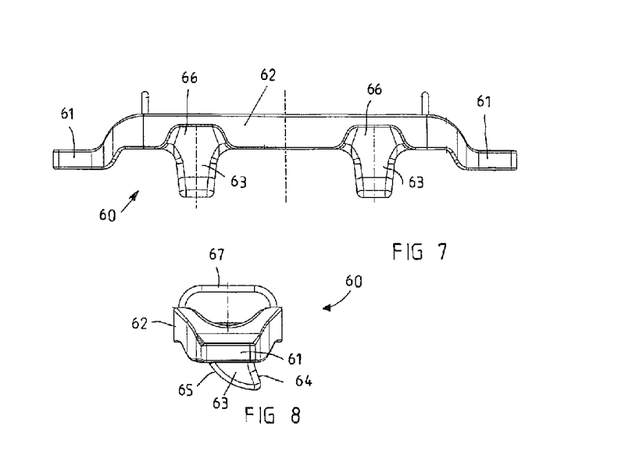
FIG. 7 shows the bridge part of the chain fixing device according to the invention in rear view.
FIG. 8 shows the bridge part from FIG. 7 in side view.

The trough element 10 shown in FIGS. 1 to 4 is configured in particular to receive a chain fixing device 50 shown in FIGS. 1 and 2 and in FIGS. 5 and 6, wherein the chain fixing device 50 can be releasably fastened according to the invention in cavities 22 in the conveyor floor 20. In the shown illustrative embodiment with conveyor floor 20 and intermediate floor 21, not only is the conveyor floor 20 provided with two cavities 22 which are spaced apart transversely to the direction of pull Z, but also the intermediate floor 21 is respectively provided with two cavities 23 which are spaced apart transversely to the direction of pull Z, the distance between the two cavities 23 in the intermediate floor 21 being equal in size to the distance between the two cavities 22 in the conveyor floor 20. The trough element 10 is constructed such that the cavities 22 in the conveyor floor 20 and the cavities 23 in the intermediate floor 21 are only aligned one above the other when a sub-portion of the conveyor floor 20, which displaceable sub-portion in the shown illustrative embodiment is formed by a floor plate 25, is displaced from the normal usage position as shown in FIGS. 3 and 4 into an assembly position as shown in FIGS. 1 and 2. In the normal usage position, the chain fixing device 50 cannot be fitted, since in the normal usage position, as is clearly evident from FIGS. 3 and 4, the cavities 22 in the floor plate 25 as part of the conveyor floor 20 are closed in the downward direction by the plate surface of the intermediate floor 21. Through the downward closure of the cavities 22 in the conveyor floor 20, not only can a fitting of the chain fixing device (50, FIG. 1) be prevented, but also no material which is conveyed in the upper strand 6 can now fall down through the cavities 22 into the lower strand.

In order to achieve the displaceability of a sub-portion of the conveyor floor 20, the floor plate 25 forms a movable sheet-metal part between two immovable sheet-metal parts 20A of the conveyor floor 20, and the floor plate 25 movable within the conveyor floor 20 projects laterally on both sides beyond the side cheeks 8 through a window 13. The movable floor plate 25 hence rests both in the usage position and in the assembly position on the intermediate floor 21, as well as on the side cheeks 8. In addition, both the marginal edges 20', running transversely to the direction of pull, of the fixed floor panels 20A, and the opposite-situated marginal edges 25' of the floor plate 25 are respectively obliquely constructed in order, by virtue of the oblique configuration, not only to ensure good mobility of the floor plate 25, but at the same time to prevent the floor plate 25 from migrating upwards through the interplay of the slopes 20' and 25'. The floor plate 25 is hereby wider on its bottom side than on its top side, so that migration or arching of the floor plate 25 in the vertical direction out of the interspace between the sheet-metal parts 20A is prevented through positive locking.

In the shown illustrative embodiment, the floor plate 25 can be detained both in the usage position and in the assembly position for the chain fixing device 50. The floor plate 25 has on the offset side, on the marginal portion 25A which on the offset side projects beyond the side cheek 8, two locking openings 26, 26A, consisting of bores, into which a locking pin 27 can be inserted as a locking element, which locking pin at the same time reaches through an opening eyelet in a locking lug 16, which is welded to the outside of the offset-sided side cheek 8, just above the floor conveyor floor 20. The locking pin 27 can be secured against getting lost by means of a simple clip, for example. The locking pin 27 is exposed to virtually no forces and it is merely necessary to ensure that the locking pin 27 is able be removed, from the offset side, as easily as possible so as to displace the floor plate 25 from the position shown in FIGS. 3 and 4 into the assembly position in which the cavities 22, 23 lie one above the other. Both the second locking opening 26A and the grip recess 28 on the marginal portion 25A enhance user friendliness, since the locking pin 27, in the assembly position, can be reinserted to prevent its possible loss also in this displacement position of the floor plate 25.

The configurations of a trough element 10 having cavities 22 in the conveyor floor 20 allow the use of a chain fixing device 50 which even at very high chain tensile forces ensures a secure blockage of the conveyor chain 1 should a tensile force be applied to the conveyor chain via the drives of the conveyor (not shown), for example due to faulty operation. The structure of the chain fixing device 50 is now described with reference to FIGS. 1 and 2 and FIGS. 5 to 9.

The chain fixing device 50 essentially comprises a bridge part 60 and two side parts 70, which form those elements of the chain fixing device 50 which are fastened in the cavities on the conveyor floor 50 and shift possible tensile forces from the conveyor chain 1 into the trough element 10. As further components of the chain fixing device 50 there are also provided securing elements 90, which can likewise be inserted together with the side parts 70 into the cavities in the conveyor floor and which prevent unintended release of the side parts 70 from the conveyor floor. The bridge part 60 overlaps both chain strands of the conveyor chain 1, transversely to the direction of pull Z, and respectively has side end portions 61 consisting of comparatively flat portions, between which extends a relatively strong bridge bar 62, which is offset upwards in relation to the side end portions 61 and runs higher, whereby the side end portions 61, in the assembled state, can lie roughly at the same height as the horizontal chain links 2, as is also clearly evident from FIG. 2. The bridge bar 62 is in turn, for each chain strand, provided with a downwardly projecting strong boss 63, which is designed to engage, in the assembled state of the chain fixing device 50, in the inner openings 4 of the horizontal chain links 2 between the noses of the vertical chain links 3. The bosses 63 are of wedge-shaped configuration and have a rearward facing, bevelled contact surface 64 for the noses of the vertical chain links 3, the contact surface 64 running angled off in such a way that it stands less than perpendicular to the running direction Z of the conveyor chain. By contrast, the front face 65 of the bosses 63, which faces in the direction of pull, runs in an arc shape so as to facilitate the fitting of the bridge parts 60. Welded onto the top side of the bridge bar 62 are grab handles 67, with which the miner can grip and move the bridge parts 60. The bridge bar 62 has on its rear side in the region of the bosses 63 a constriction 66, in order that the vertical chain links can come to bear with their chain link noses fully against the contact surface 64 of the bosses 63.

Both side parts 70 of the chain fixing device are of mutually identical construction and comprise a strong, relatively large cantilever arm 71 of U-shaped longitudinal section, which cantilever arm has at its front end a downward jutting supporting leg 72 and on its rear side a base portion 73, which on its rear side is provided with a rearwardly open recess 74 that serves for the insertion and reception of one of the end portions 61 of the bridge part 60 (cf. FIG. 5). The base portion 73 is provided with a foot portion 75 beneath the recess 74, which foot portion comprises a keel 76 which is tapered in relation to the base portion 73 and which in the front region, in this case adjoining hereto up to the front side 76' of the keel 76, is provided on both sides with laterally protruding, straight bars 77. Between the bottom side 73' of the base portion 73 and the bars 77 is hereby formed a receiving gap, within which, in the assembled state, the marginal portions of the floor plate 25 make contact. Insofar as the chain fixing device is in the assembly position, the bars 77 support the floor plate 25 to both sides of the cavity 22, whereby the side parts 70 are protected against upward migration from the cavities 22. As is clearly evident from FIG. 2, in this assembly position the front face 76' of the keel 76 bears against the front wall 22' (FIG. 4) of the cavity 22, which front wall is situated in the direction of pull Z. In order that the keel 76 can be inserted with the lateral bars 77, which widen the cross section of the keel, into the cavities 22 in the floor plate 25, and also into the cavities 23 in the intermediate floor 21, at least the side margins 22" of the cavities 22 are of multi-stepped configuration. The largest width of the cavity 22 is sufficient that only in the region of this widest cross section of the cavities 22 can the side parts intrude into these, whereas, when displaced forwards in the direction of pull Z, they are vertically secured by positive locking to the floor plate 25 and, where necessary, also to the intermediate floor 21. The cavities 23 in the intermediate floor 21 here have, in relation to the cavities 22, a simplified cross section having just one step on the side margins, but could also be given the same shaping as the cavities 22.

The length of the cantilever arm 71 or the distance of the supporting leg 72 from the base portion 73 is dimensioned such that, with the cantilever arm 71, a scraper 5, as shown in FIGS. 1 and 2, can be fully spanned, and that the cantilever arm 71 can be supported with the supporting arm 72, in front of the scraper 5 in the direction of pull, on the fixed floor portion 20A of the conveyor floor 20. The cantilever arm 71 can hereby form a torque support for the support of forces which might be generated around the keel 76 as the fulcrum, should traction be applied to the side parts 70 via the conveyor chain 1 and the bridge part 60. The keel 76 is provided on the rear side with projecting sliding stops 78, which protrude on both sides and extend downwards to roughly level with the top side of the bars 77, so as to achieve an optimally extensive contact of the side parts 70 against one of the steps of the cavity 22.

Figure 9:
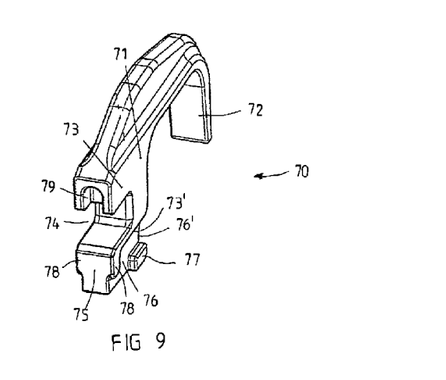
FIG. 9 shows in perspective representation a side part for the chain fixing device according to the invention.
Figure 10:
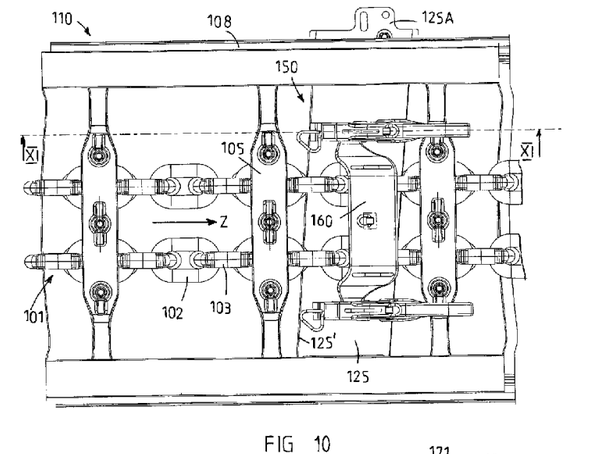
FIG. 10 shows a trough element with double-middle high-capacity chain and fitted chain fixing device according to an alternative illustrative embodiment in top view.

In order to secure the chain fixing device 50, insofar as it is fitted, against unintended release and, at the same time, visually indicate to the miner that the two side parts 70 are correctly fitted and locked within the cavities 22 in the conveyor floor 20, for each side part 70 there is provided a locking element 90, which consists of a locking block 91 that merges in the downward direction into a tapered keel block 92, which in the assembled state of the chain fixing device 50, like the keel 76 of the side parts 70, intrudes into the cavity 22. In the shown illustrative embodiment, the keel block 92 has on the rear side a step 93, whereby the locking element 90 can rest with the rear set-back offset on the intermediate floor 21 and intrudes only with the front portion also into the cavity 23 in the intermediate floor 21. On the locking block 91 there is configured a horizontal bore 94 with a securing pin 95 guided displaceably therein, this securing pin 95 being connected to a locking or gripping clamp 96, which is here bent essentially in the shape of a triangle. In the top side of the locking block 91 a transverse groove 97 is recessed, and the locking clamp 96 is positioned with the vertically rising clamp leg 96A such that only when the locking pin 95 is in the locking position, in which it engages in a bulge 79 on the rear side of the base portion 73 above the recess 74, the clamp leg 96A lies in alignment parallel to the groove 97. In this position, the pin 95 can then be rotated through 90° about its axis by rotation of the locking clamp 96, whereby the leg 96A lies horizontally and gains a position in which it extends parallel to the groove 97 and transversely to the direction of pull Z and hereupon intrudes into the groove 97, whereby a displacement of the securing pin 95 is prevented. This securement position is prevented by the securing pin 95. This securement position is not represented in the figures. Since, in the shown illustrative embodiment, the locking clamp 96 is closed in the shape of a triangle, the locking block 91 has also on the rear side an indentation 98, which is reached through by a further leg of the locking clamp 96A. The locking clamp 96, which, as a result of the triangular shaping, is at the same time configured as a handgrip, allows the locking pin 95 to be withdrawn from the side part 70 in a relatively comfortable manner so as then to be able to lift the locking block 91 upwards out of the cavities. If both locking blocks 91 are removed, the bridge part 60 can then be displaced rearwards in order that the side end portions 61 of the bridge part 60 exit the recesses 74 and the bridge part 60 can be lifted away upwards. After this, both side parts 70, which can be well gripped via the associated grips 70A on the top side of the cantilever arms 71, must first be displaced rearwards before the bars 77 make their way beneath the widest cross section of the cavities 22 in the conveyor floor 20 and the side parts 70 can be lifted away upwards. Only when also both side parts 70 have been removed is the movable part of the conveyor floor 20, in this case, therefore, the floor plate 25, pushed back into the normal usage position and secured there, by re-application of the securing pin 27, secured against unintended displacement. The fitting of the chain fixing device 50 is realized correspondingly in reverse, in that the floor plate 25 is first displaced and then the side parts 70 are inserted into the cavities in the conveyor floor.

FIGS. 10 to 13 show a trough element 110 and a chain fixing device 150 according to a second illustrative embodiment. Same or functionally identical structural parts are provided with reference symbols increased by 100. As is clearly revealed by the top view in FIG. 10, the conveyor chain 101, which is once again constructed as a double-middle chain, has horizontal chain links 102 and vertical chain links 103, which respectively consist of interlocking round chain links having round noses or nose parts. The scraper elements 105 are connected to inner openings of the horizontal chain links 102. As in the previous illustrative embodiment, the chain fixing device 150 comprises a bridge part 160, which engages with the integrally moulded-on side end portions 161 in rearwardly open recesses 174 in the side parts 170, and locking elements 190. The side parts 170 are configured identically as in the previous illustrative embodiment and comprise on the one hand a supporting arm 171, and also a foot portion 175 which can be inserted into cavities 122 in the conveyor floor 120.

Figure 13:
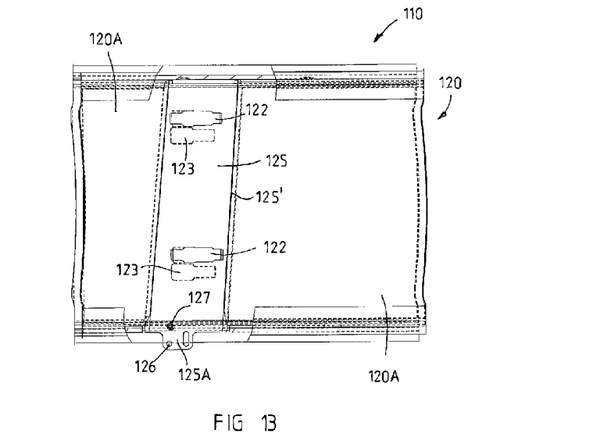
FIG. 13 shows a trough element according to FIG. 10 in top view without chain fixing device, partially broken open.

As is illustrated, in particular, by FIG. 13, in the trough element 110 the cavities 122 are here too configured on a floor plate 125 arranged on the side cheeks 108 of the trough element 110 in such a way that it is displaceable transversely to the direction of pull Z of the conveyor chain 101. The floor plate 125 is configured, however, substantially in the shape of a parallelogram and is here displaceable not perpendicularly to the direction of pull Z, but at an angle of about 86° transversely to the direction of pull Z. The marginal edges 125' of the floor plate 125 stand correspondingly obliquely to the direction of pull Z, the angle of the two marginal edges preferably being slightly different in order that the floor plate 125 tapers gently in width in the direction of the working face. The scraper elements 105 can then pass evenly over the marginal edges 125', as will be clearly apparent from FIG. 10 to the person skilled in the art. The adjacent, immovable sheet-metal parts 120A of the conveyor floor 120 have correspondingly oblique edge lines, to be precise both in the horizontal plane and, as in the previous illustrative embodiment, in the vertical direction, so as to upwardly secure the floor plate 125 between the two fixed sheet-metal parts 120A by positive locking. The displacement of the floor plate 125 is realized once again via a marginal portion 125A, which at the same time is also provided with locking openings 126 for a locking pin 127. The intermediate floor 121 too is provided with cavities 122, the cavities 122 present in the floor plate 125 and the cavities 123 in the intermediate floor 121 being able to be pushed one above the other to allow the side parts 170 of the chain fixing device to be fitted on the trough element 110.

Figure 12:
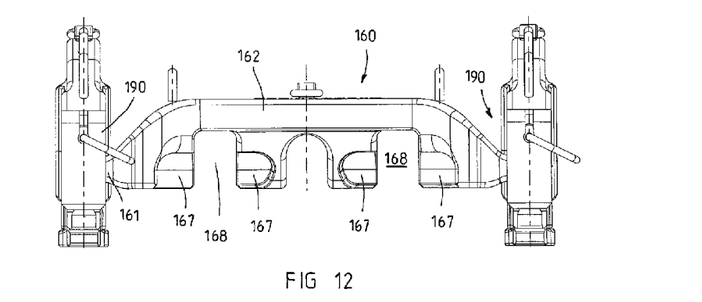
FIG. 12 shows the chain fixing device according to a second illustrative embodiment in a view of the rear side.

In adaptation to the altered geometry of the vertical chain links 103 and horizontal chain links 102, the bridge part 160 also has a slightly modified structure, as can be seen particularly clearly from FIG. 12. Though the bridge part 160 has a bridge bar 162 which has a greater height than the two side end portions 161, the bridge bar 162 is provided respectively on its rear side only with contact zones 167 for the side regions of the nose parts of the horizontal chain links, between which there is respectively configured a receiving slit 168, in which the vertical chain links can reach through the bridge part 160 or the bridge bar 162 without coming into contact with the bridge part 160 in the direction of pull. The force transmission between the conveyor chain and the bridge bar 162 is realized solely via the horizontal chain links at the contact zones 167.

Figure 11:
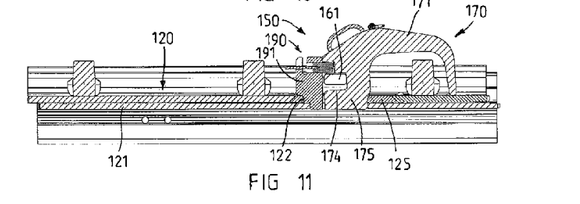
FIG. 11 shows a sectional view along XI-XI in FIG. 10.

The locking elements 190, which can be inserted together with the foot parts 175 of the side parts 171 into the cavities 122, 123, have locking blocks 191 which are slightly modified in relation to the first illustrative embodiment, since these are provided on the rear side with a double offset, as is clearly evident from FIG. 11, so as to seat themselves with a rear flank also on the top side of the displaceable floor plate 125. Otherwise, the locking elements are configured identically as in the previous illustrative embodiment, so that reference can be made to the description that is provided there.

For the person skilled in the art, the preceding description can give rise to numerous modifications which shall fall within the scope of the claims. Instead of providing a displaceable portion in the conveyor floor, the intermediate floor could also be provided with a sliding plate. The invention is not limited to the shown illustrative embodiment. With respect to the shaping of the individual parts, manifold modifications can be obtained, which modifications will be readily apparent to the person skilled in the art and shall fall within the scope of the appended claims. The trough elements and the chain fixing device can be used on or close to the main and auxiliary drive of a scraper chain conveyor, for example also in a connecting trough. The side parts are inserted in such a way that the arms point respectively in the direction of the traction drive, whilst the other drive is used only to balance a suspension chain. Normally, that drive which lies remote from the chain fixing device is used as the traction drive. To the person skilled in the art, it will also be apparent from the preceding description that the bridge parts and side parts, depending on the design of the chain links, can also be given a different design. The floor plate can also be of trapezoidal configuration and taper towards one end. The features of the trough elements and of the individual elements of the chain fixing device according to the first and second illustrative embodiment can also be mutually combined.

The invention claimed is:

1. A chain fixing device for securing at least one conveyor chain on a trough element pan of a chain conveyor, in particular of an underground scraper chain conveyor, comprising:
   a bridge part, which has a bridge bar that at least partially overlaps the conveyor chain in a positive-locking manner and ends in two lateral side end portions,
   two side parts provided on a front side with cantilever arms, the cantilever arms having a downwardly protruding supporting leg for support on a conveyor floor, and which are fastenable to the trough element pan and to which the side end portions of the bridge part are releasably securable;
   wherein the two side parts are releasably fastenable in a positive-locking manner in cavities in the conveyor floor of the trough element.

2. The chain fixing device according to claim 1, wherein each side part has on its rear side a recess for a side end portion of the bridge part and beneath the recess a foot portion which is insertable into the cavities in the conveyor floor and has a tapered keel with laterally protruding bars for supporting at least the conveyor floor.

3. The chain fixing device according to claim 2, wherein the keel is provided on the rear side with a laterally protruding sliding stop.

4. The chain fixing device according to claim 1, wherein the bridge parts are provided on the bridge bar with downwardly protruding bosses for engagement in inner openings of horizontal chain links of the conveyor chain.

5. The chain fixing device according to claim 4, wherein the bosses are of wedge-shaped configuration and have a rear-facing contact surface running in a path which is angled off less than perpendicularly, and preferably have an arc-shaped front face.

6. The chain fixing device according to claim 4, wherein the bridge bar, on the rear side in the region of the bosses, respectively has a constriction.

7. The chain fixing device according to claim 1, wherein the bridge parts, on the rear side of the bridge bar, are provided with contact zones for the nose parts of horizontal chain links of the conveyor chain.

8. The chain fixing device according to claim 7, wherein the bridge parts are provided between the contact zones with receiving slits for vertical chain links of the conveyor chain.

9. The chain fixing device according to claim 1, wherein for each side part there is provided a securing element, which is partially insertable into the cavity in the conveyor floor and which in the assembled state, by positive locking, prevents displacement of the side part from an operating position into a disassembly position.

10. The chain fixing device according to claim 9, wherein the securing element has a securing block and a securing pin displaceable in the securing block, which securing pin in a lock position is securable against displacement.

11. The chain fixing device according to claim 10, wherein the securing pin is connected to a locking clamp, within which the securing pin is axially displaceable and rotatable about its pin axis in such a way that, in a pivot position, an axial displacement of the securing pin is blocked.

12. A trough element for a chain conveyor, in particular an underground scraper chain conveyor, comprising:
   an upper strand;
   a lower strand;
   side profiles for guiding driver elements of a conveyor chain,
   a conveyor floor separating the upper strand and the lower strand and an intermediate floor beneath the conveyor floor,
   a device for applying a chain fixing device, wherein the device comprises at least two cavities in the conveyor floor, into which cavities side parts of a multipart chain fixing device are insertable in a positive-locking manner;
   wherein the cavities are configured within a floor plate, which forms a part of a multipart conveyor floor and is arranged in the trough element so as to be displaceable transversely to the running direction of the conveyor chain.

13. The trough element according to claim 12, wherein beneath the conveyor floor there is disposed the intermediate floor, which is provided with further cavities, which are preferably configured similarly to those in the conveyor floor, the floor plate being displaceable into a position in which the cavities in the conveyor floor and in the intermediate floor are in mutual alignment.

14. The trough element according to claim 12, wherein the floor plate is displaceable perpendicularly to a running direction (Z), or in that the floor plate is displaceable obliquely to the running direction (Z).

15. The trough element according to claim 14, wherein the floor plate is displaceable at an angle within a range of between approximately 83° and 88° obliquely to the running direction (Z).

16. The trough element according to claim 12, wherein the floor plate has marginal edges running at an angle within a range of between approximately 83° and 88° obliquely to the running direction (Z).

17. The trough element according to claim 12, wherein beneath the conveyor floor there is disposed at least one plate portion, which is arranged in the trough element so as to be displaceable transversely to the running direction of the conveyor chain and which is provided with further cavities, which are preferably configured identically to those in the conveyor floor, the plate portion being displaceable into a position in which the cavities in the conveyor floor and in the plate portion are in mutual alignment.

18. The trough element according to claim 12, wherein the floor plate or the plate portion projects with a marginal portion laterally beyond the associated side profile, the marginal portion being provided with a locking opening, into which a locking element, for detaining the floor plate or the plate portion in the normal usage position, is insertable.

19. The trough element according to claim 12, wherein the cavities have on both sides multi-stepped side margins.

20. A chain fixing device for securing at least one conveyor chain on a trough element pan of a chain conveyor, in particular of an underground scraper chain conveyor, comprising:
   a bridge part, which has a bridge bar that at least partially overlaps the conveyor chain in a positive-locking manner and ends in two lateral side end portions, the bridge part including downwardly protruding bosses for engagement in inner openings of horizontal chain links of the conveyor chain, the bosses having a wedge-shaped configuration and a rear-facing contact surface running in a path which is angled off less than perpendicularly;
   two side parts which are fastenable to the trough element pan and to which the side end portions of the bridge part are releasably securable;
   wherein the two side parts are releasably fastenable in a positive-locking manner in cavities in the conveyor floor of the trough element.

21. The chain fixing device according to claim 20, wherein the bridge part, on the rear side of the bridge bar, includes contact zones for nose parts of horizontal chain links of the conveyor chain.

22. The chain fixing device according to claim 21, wherein the bridge part includes contact zones with receiving slits for vertical chain links of the conveyor chain.

23. A trough element for a chain conveyor, in particular an underground scraper chain conveyor, comprising:
   an upper strand;
   a lower strand;
   side profiles for guiding driver elements of a conveyor chain,
   a conveyor floor separating the upper strand and the lower strand and an intermediate floor beneath the conveyor floor,
   a device for applying a chain fixing device, wherein the device comprises at least two cavities in the conveyor floor, into which cavities side parts of a multipart chain fixing device are insertable in a positive-locking manner;
   at least one plate portion disposed beneath the conveyor floor, which is arranged in the trough element so as to be displaceable transversely to the running direction of the conveyor chain and which is provided with further cavities, which are substantially similar to those in the conveyor floor, the plate portion being displaceable into a position in which the cavities in the conveyor floor and in the plate portion are in mutual alignment.

24. The trough element according to claim 23, wherein the floor plate or the plate portion projects with a marginal portion laterally beyond the associated side profile, the marginal portion being provided with a locking opening, into which a locking element, for detaining the floor plate or the plate portion in the normal usage position, is insertable.

25. A trough element for a chain conveyor, in particular an underground scraper chain conveyor, comprising:
   an upper strand;
   a lower strand;
   side profiles for guiding driver elements of a conveyor chain,
   a conveyor floor separating the upper strand and the lower strand and an intermediate floor beneath the conveyor floor,
   a device for applying a chain fixing device, wherein the device comprises at least two cavities in the conveyor floor, into which cavities side parts of a multipart chain fixing device are insertable in a positive-locking manner;
   wherein the cavities have on both sides multi-stepped side margins.

26. The trough element according to claim 25, wherein beneath the conveyor floor there is disposed the intermediate floor, which is provided with further cavities, which are configured similarly to those in the conveyor floor, and a floor plate being displaceable into a position in which the cavities in the conveyor floor and in the intermediate floor are in mutual alignment.

* * * * *